United States Patent [19]

Kovacik et al.

[11] Patent Number: 4,725,697

[45] Date of Patent: Feb. 16, 1988

[54] EXTENSION CORD REEL AND CASE

[75] Inventors: James D. Kovacik; James W. Kovacik, both of Parma; Thomas J. Blanch, Hudson; Paul S. Blanch, Valley View, all of Ohio

[73] Assignee: Alert Stamping & Mfg. Co., Inc., Bedford Heights, Ohio

[21] Appl. No.: 901,281

[22] Filed: Aug. 28, 1986

[51] Int. Cl.$^4$ .......................................... H02G 11/02
[52] U.S. Cl. ........................................................ 191/12.4
[58] Field of Search .......................... 191/12.4, 12.2 R; 411/122; 292/300, 302, 1; 220/4 B

[56] References Cited

U.S. PATENT DOCUMENTS

| | | | |
|---|---|---|---|
| 3,619,518 | 11/1971 | Blanch et al. | 191/12.2 R |
| 3,715,526 | 2/1973 | Blanch et al. | 191/12.2 R |
| 3,803,670 | 4/1974 | Johnson | 411/508 |
| 3,870,133 | 3/1975 | Brennenstuhl | 191/12.4 |
| 4,244,536 | 1/1981 | Harrill | 191/12.4 |
| 4,338,497 | 7/1982 | Drew | 191/12.4 |
| 4,509,383 | 4/1985 | Yeh | 191/12.4 |
| 4,520,239 | 5/1985 | Schwartz | 191/12.4 |
| 4,653,833 | 3/1987 | Czubernat et al. | 191/12.4 |
| 4,656,320 | 4/1987 | Maddock | 191/12.4 |

FOREIGN PATENT DOCUMENTS 3310715  9/1984  Fed. Rep. of Germany ..... 191/12.2 R

Primary Examiner—Robert B. Reeves
Assistant Examiner—Thomas W. Kearns
Attorney, Agent, or Firm—Marshall & Melhorn

[57] ABSTRACT

An extension cord reel and carrying case is formed of a high impact plastic material. The case is formed of two cup-shaped halves which are releasably attached by cooperating locking tabs and locking apertures. The reel is also formed of two halves and includes a pair of duplex outlets and a circuit breaker. The reel is supported in the case on flanges extending through openings in the case and is manually rotated.

17 Claims, 5 Drawing Figures

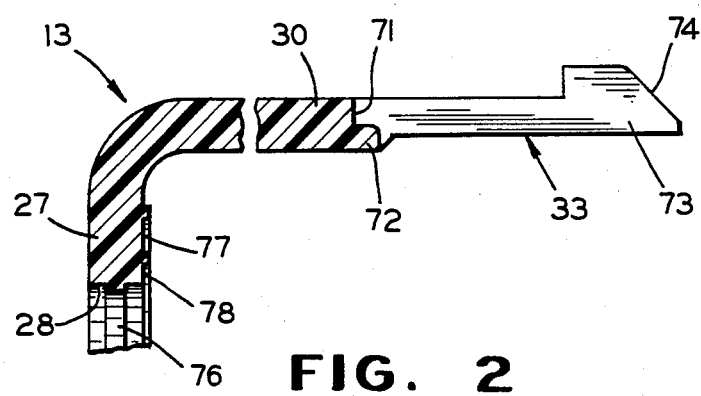
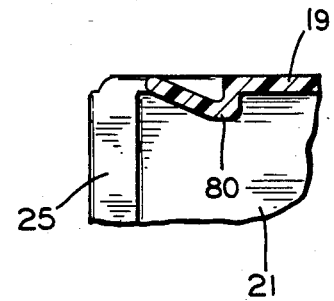
FIG. 2
FIG. 3
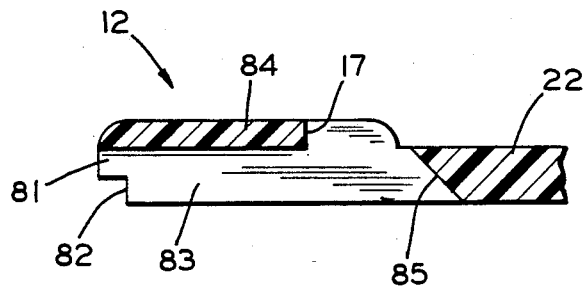
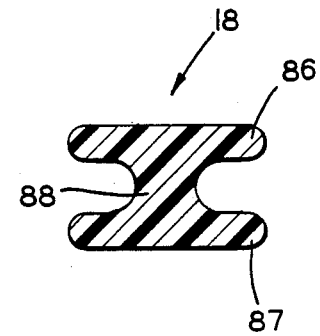
FIG. 4
FIG. 5

EXTENSION CORD REEL AND CASE

BACKGROUND OF THE INVENTION

The present invention relates generally to extension cord reels and particularly to such a reel enclosed in a protective outer carrying case.

There are many prior art extension cord reels for winding up and storing an extension cord. Typically, one end of the extension cord includes a plug for engaging a power outlet receptacle at a source of power and the other end of the extension cord is connected to an electrical outlet and/or a light. Such reels are particularly useful with portable appliances.

The reel or pulley upon which the extension cord is wound can be enclosed by a case or rotatably mounted on an open frame. A ratchet mechanism can be provided for maintaining the reel in a desired position and a spring can be provided for automatically rewinding the cord on the reel. The prior art cases and frames are typically formed of metal and are very difficult to disassemble for repair.

SUMMARY OF THE INVENTION

The present invention provides an extension cord reel or pulley and carrying case made from a moldable material such as plastic. The reel includes multiple electrical outlets and the case is provided with a carrying handle. The reel is molded in two halves including apertures for receiving standard electrical receptacles and a resetable circuit breaker. The case is also molded in two halves with one half including apertures and the other half including cooperating locking tabs for ease of assembly and disassembly. One of the halves also has a handle molded integral therewith.

It is an object of the present invention to provide an extension cord storage reel and carrying case which are light in weight and easy to carry.

It is another object of the present invention to provide an extension cord reel and carrying case which are inexpensive to manufacture and assemble.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is an enlarged, fragmentary view as if in cross-section of a portion of the carrying case and a locking lug of the invention of FIG. 1;

FIG. 3 is an enlarged fragmentary view as if in cross-section of a portion of the opening for the extension cord in the carrying case of the invention of FIG. 1;

FIG. 4 is an enlarged, fragmentary view as if in cross-section of one of the locking apertures in the carrying case of the invention of FIG. 1; and FIG. 5 is an enlarged view as if in cross-section through the handle of the carrying case of the invention of FIG. 1.

DESCRIPTION OF THE PREFERRED EMBODIMENT

Figure 1:
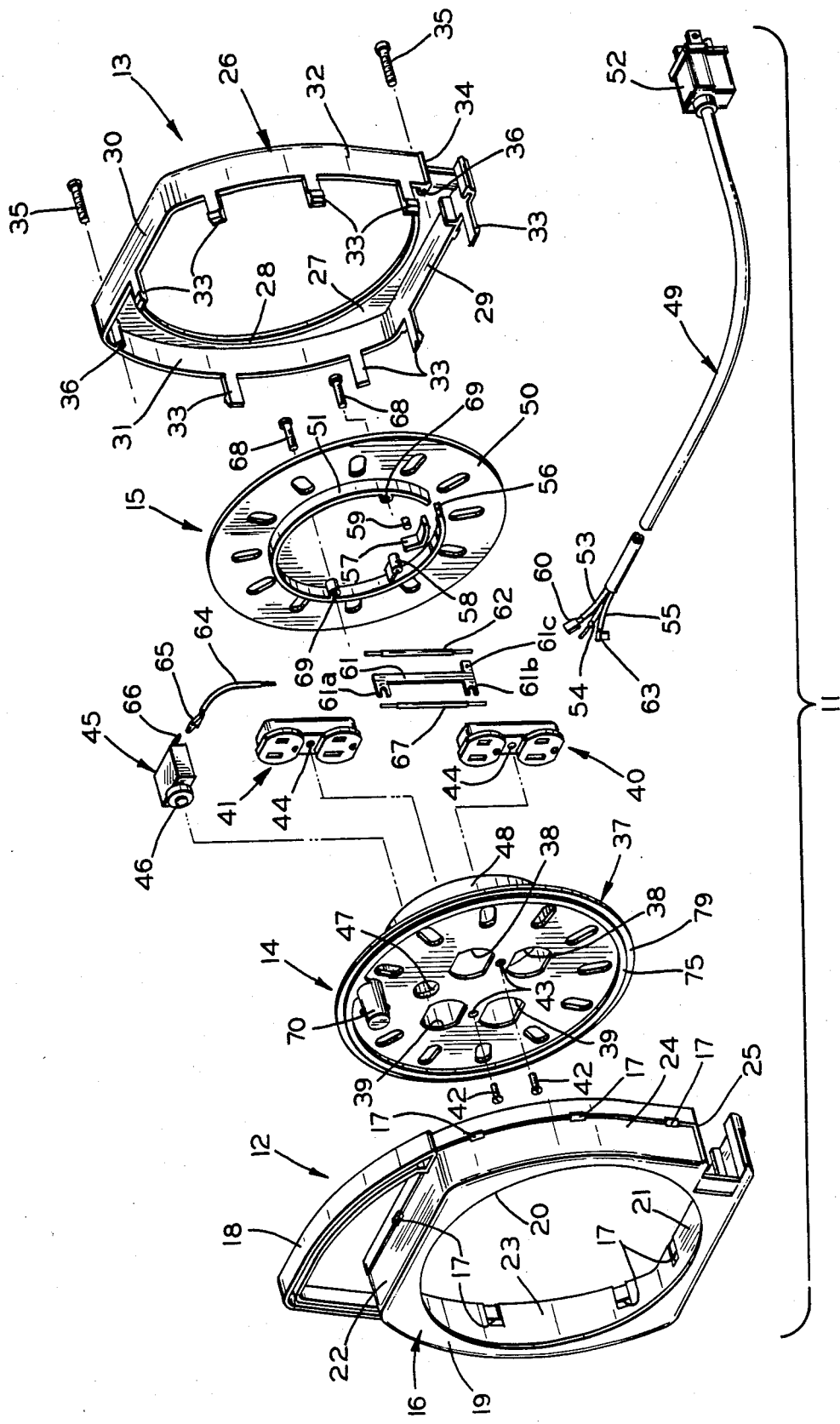
FIG. 1 is an exploded perspective view of an extension cord reel and carrying case in accordance with the present invention.

There is shown in FIG. 1 an exploded perspective view of an extension cord reel and carrying case assembly 11 in accordance with the present invention. The assembly 11 includes a first case half 12 which cooperates with a second case half 13 to enclose a reel for storing an extension cord. The reel is formed of a first half 14 which includes apertures for electrical receptacles 40 and 41 and a circuit breaker 45, and a second half 15 which includes retaining means for one end of the extension cord.

The first case half 12 has a body 16 with a plurality of locking apertures 17 formed therein and a carrying handle 18 molded integral therewith. The case body 16 is generally cup-shaped with a bottom wall 19 having a large central aperture 20 formed therein. The case body 16 includes sidewalls extending from and generally perpendicular to the bottom wall 19 such as a pair of opposed generally planar sidewalls 21 and 22 connected at opposite ends by generally curved sidewalls 23 and 24. The sidewall 24 has an aperture 25 formed therein at the point it joins the planar sidewall 21. The aperture 25 provides an opening for the extension cord as will be discussed below. The handle 18 has one end attached to the sidewall 22 where said sidewall joins the sidewall 24, and another end attached to the outer surface of the sidewall 23. The handle 18 cooperates with the sidewall 22 to form an opening for receiving the fingers of a human hand to enable the carrying case and extension cord reel to be carried from place to place. The locking apertures 17 are formed in all the sidewalls 21 through 24 and are located adjacent the edges of the sidewalls opposite the bottom wall 19 at the ends of slots formed in the interior surfaces of the sidewalls.

The second case half 13 has a generally cup-shaped case body 26 with a bottom wall 27 having a large central aperture 28 formed therein. Extending from and generally perpendicular to the bottom wall 27 is a pair of opposed generally planar sidewalls 29 and 30 joined by a pair of opposed generally curved sidewalls 31 and 32. Extending from the edges of the sidewalls opposite the bottom wall 27 are a plurality of locking tabs 33 which cooperate with the locking apertures 17 in the first case half 12 to retain the case halves in abutting relationship when the cord reel and the carrying case are assembled. The sidewall 32 also has an aperture 34 formed therein to cooperate with the aperture 25 formed in the first cafe half 12 to provide access for the extension cord. A pair of threaded fasteners 35 extend through apertures 36 formed in the bottom wall 27 and the sidewalls 31 and 32. The threaded fasteners 35 threadably engage apertures (not shown) formed on the inside surfaces of the sidewalls 23 and 24 to further secure the first case half 12 to the second case half 13.

The first reel half 14 has a generally disk-shaped body 37 with a first pair of apertures 38 and a second pair of apertures 39 formed centrally therein. The apertures 38 and 39 are configured to accept the plug receiving portions of pair of duplex outlets 40 and 41 respectively. A pair of threaded fasteners 42 extend through a corresponding pair of apertures 43 formed between each of the pairs of apertures 38 and 39 to threadably engage a threaded aperture 44 formed in each of the duplex outlets 40 and 41. The fasteners 42 retain the duplex outlets 40 and 41 in position against the inner surface of the body 37.

A resetable circuit breaker 45 has a reset button extension 46 which extends through an aperture 47 formed in the body 37. The extension 46 can be a press fit in the aperture 47 or suitable fastening means (not shown) can be utilized to retain the circuit breaker 45. The apertures 38, 39 and 47 all are located within a circular wall 48 extending generally perpendicular to the inwardly facing surface of the disk-shaped body 37. The outer surface of the circular wall 48 accepts an extension cord 49 as it is wound onto and unwound from the cooperating reel halves 14 and 15.

The second reel half 15 has a disk-shaped body 50. A circular wall 51 is formed on an inwardly facing surface of the body 50 and is generally of the same diameter as the circular wall 48 to cooperate therewith in forming a storage surface for the extension cord 49. The extension cord 49 has a plug 52 formed on one end thereof and the ends of three wires 53, 54 and 55 extending from the other end thereof. The end of the cord having the plug 52 extends through the aperture formed by the openings 25 and 34 in the outer case. The end of the cord with the wires extends through an aperture 56 formed in the circular wall 51. The body 50 has a short wall 57, a post 58 and a second post 59 located within the circular wall 51 and extending from the inwardly facing surface of the body 50. The extension cord 49 is inserted through the opening 56 and extends between the wall 51 and the wall 57. The cord 49 then extends between the end of the wall 57 and the post 58 and doubles back between the wall 57 and the post 59. Finally, the cord 49 extends around the post 59 toward the center of the disk-shaped body 50 at which point the wires 53, 54 and 55 are electrically connected to the outlets 40 and 41 and the circuit breaker 45.

The wire 53 is a ground wire and has a female terminal 60 connected to the end thereof which terminal is electrically connected to a male terminal 61c formed on a ground bridge 61. The bridge 61 has U-shaped terminals 61a and 61b formed on each end thereof for electrical connection between the ground terminals (not shown) of the outlets 40 and 41. Typically, the cord 49 is a standard three wire electrical cord wherein the wire 54 has white insulation and the wire 55 has black insulation. The wire 54 is electrically connected to one side of the duplex outlet 41. A short length of white wire 62 can then be utilized to connect the one side of the duplex outlet 41 to the corresponding side of the duplex outlet 40. The wire 55 is connected to a terminal 63 which is electrically connected to one terminal (not shown) of the circuit breaker 45. A short wire 64 which can have black insulation has a terminal 65 electrically connected to one end thereof for electrical connection to a terminal 66 on the circuit breaker 45. The opposite end of the wire 64 is electrically connected to the other side of the outlet 40. A short length of wire 67, typically with black insulation, is connected between the other side of the duplex outlet 40 and the corresponding side of the duplex outlet 41. Thus, the duplex outlets 40 and 41 provide four electrical outlets which are connected in parallel and are protected by the circuit breaker 45 which is in series with the "hot" side of the power cord 49.

The reel halves 14 and 15 are attached together by a pair of threaded fasteners 68 which extend through apertures 69 formed in the disk-shaped body 50. The threaded fasteners 68 extend into and threadably engage threaded apertures (not shown) formed in the inwardly facing surface of the disk-shaped body 37. Typically, the extension cord 49, the bridge 61, and the wires 62, 64 and 67 are connected to the outlets 40 and 41 and the circuit breaker 45 to form an electrical assembly. Then this electrical assembly is inserted into the corresponding apertures in the reel half 37, and the reel half 50 is assembled thereto utilizing the threaded fasteners 68. The reel and extension cord assembly is then placed inside the first case half 12 and the second case half 13 is assembled thereto utilizing the locking tabs 33 and the threaded fasteners 35. An outwardly extending post-like handle 70 is formed on an outer surface of the disk-shaped body 37 and extends through the central aperture 20 formed in the first case half 12. The handle 70 is adapted to be grasped between the thumb and first finger of a human hand for rotating the reel assembly to wind the extension cord 49 on the outer surfaces of the circular walls 48 and 51. The post 70 is typically formed near the perimeter of the disk-shaped body 37 to provide an increased mechanical advantage.

There is shown in FIG. 2 an enlarged fragmentary view taken as if in cross-section through the bottom wall 27 and the sidewall 30 of the second case half 13. The locking tab 33 extends from an outer edge 71 of the sidewall 30 and is representative of all of the locking tabs 33 shown in FIG. 1. The edge 71 includes an outwardly extending flange 72 which corresponds with a complementary shaped edge of the first case half 12 as will be discussed below. The outer end of the locking tab 33 includes an enlarged head 73 having a ramp surface 74 formed thereon. As shown in FIG. 1, the body 37 includes a circular flange 75 formed on its outwardly facing surface and spaced inwardly from the peripheral edge thereof. Although not shown, a similar flange is formed on the outwardly facing surface of the body 50. The flanges on the bodies 37 and 50 extend through the apertures 20 and 28 respectively. A radially inwardly extending flange 76 is formed about the periphery of the aperture 28 to reduce the contact area and thus the friction with the outer sidewall of the flange on the body 50 as the reel rotates within the case. The central opening 20 has a similar flange (not shown) formed thereon for cooperation with the outer sidewall of the flange 75. A pair of circular flanges 77 and 78 are formed on an inwardly facing surface of the bottom wall 27 about the periphery of the opening 28. The flanges 77 and 78 cooperate with the outer surface of the body 50 between the circular flange (not shown) and the periphery of the body. Similar flanges (not shown) formed on the inner surface of the bottom wall 19 cooperate with an outer surface area 79 of the body 37 formed between the periphery of the body and the circular flange 75. The purpose of the flanges 77 and 78 is to reduce the contact area and thus the frictional drag as the reel is rotated within the outer case.

There is shown in FIG. 3 an enlarged fragmentary view of the extension cord aperture 25 taken as if in cross-section through the bottom wall 19 of the first case half 12. The wall 19 has an inwardly extending projection 80. A similar projection (not shown) is formed in the bottom wall 27 of the second case half 13. These projections tend to guide the extension cord 49 between the disk-shaped bodies 37 and 50 as the extension cord is being wound onto and unwound from the reel assembly.

There is shown FIG. 4 an enlarged fragmentary view taken as if in cross-section through one of the locking apertures 17 formed in the first half case 12. For example, the aperture 17 could be the aperture formed in the planar sidewall 22. The sidewall 22 has an outer edge 81 with an annular recess 82 formed therein for receiving the flange 72 of the outer edge 71 of the sidewall 30. As the locking tab 33 is moved toward the corresponding aperture 17, the ramp surface 74 of the enlarged head 73 engages the outer edge 81. A slot 83 is formed in the wall 22 between the outer edge 81 and the aperture 17 for receiving the end of the locking tab 33. The locking tab 33 is bent radially inwardly and moves along an inner surface of the upper wall of the slot 83. When the enlarged head 73 reaches the aperture 17, it snaps radially outwardly into the aperture thereby preventing the locking tab from being retracted from the slot 83 and holding the case halves 12 and 13 together. A radially inwardly located wall 85 of the sidewall 22 is ramped to cooperate with the ramp surface 74 of the enlarged head 73. Each of the locking apertures 17 is similarly shaped.

There is shown in FIG. 5 an enlarged view taken as if in cross-section through the handle 18 of FIG. 1. The handle 18 has an "I" cross-sectional shape and is formed as a pair of generally parallel upper and lower flanges 86 and 87 respectively joined by a web section 88.

Advantageously, the case halves 12 and 13 and the reel halves 14 and 15 are formed of a molded plastic such as a high impact styrene material. Such material is strong enough to withstand impacts during use and is flexible enough to allow the locking tabs 33 to be deformed during assembly and disassembly.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An extension cord reel and carrying case assembly comprising:
   a reel for storing an extension cord;
   a pair of cup-shaped case halves surrounding said reel, at least one of said case halves having an opening formed therein;
   means for releasably securing said case halves together including at least one locking aperture formed in one of said case halves and a cooperating locking tab formed on the other one of said case halves, said locking aperture being adjacent an edge of a sidewall of said one case half at one end of a slot, said slot being formed on an inner surface of said sidewall and extending to said edge; and
   means for rotating said reel attached to said reel and extending through said opening.

2. The assembly according to claim 1 wherein said reel and said case halves are formed from a plastic material.

3. The assembly according to claim 2 wherein said plastic material is a high impact styrene material.

4. The assembly according to claim 1 wherein said reel includes a pair of disk-shaped bodies each having a generally circular wall extending perpendicular to an inwardly facing surface thereof, said walls abutting to form an outer surface for storing an extension cord.

5. The assembly according to claim 4 wherein one of said disk-shaped bodies has at least one electrical outlet attached thereto.

6. The assembly according to claim 5 wherein the other one of said disk-shaped bodies has an aperture formed in said circular wall for accepting an end of an extension cord electrically connected to said electrical outlet.

7. The assembly according to claim 6 wherein said extension cord is electrically connected to said electrical outlet through a circuit breaker.

8. The assembly according to claim 1 wherein one of said case halves has a carrying handle attached thereto.

9. The assembly according to claim 1 wherein said locking tab includes an enlarged head having a ramp surface formed thereon.

10. The assembly according to claim 1 wherein said means for rotating includes a post extending in a generally axial direction from an outwardly facing surface of said reel through said opening.

11. A cord reel assembly comprising:
    a pulley having a generally tubular body with a radially outwardly extending flange formed at each end to define a cord storage area between said flanges;
    a pair of cup-shaped case halves surrounding said pulley, at least one of said case halves having an opening formed therein for permitting passage of a cord between said reel and an exterior of said case; and
    means for releasably securing said case halves together including at least one locking aperture formed in one of said case halves and at least one cooperating locking tab formed on the other one of said case halves wherein said locking tab has an enlarged head with a ramp surface formed thereon and said locking aperture is formed at the end of a slot extending along an inner wall of said one of said case halves.

12. The assembly according to claim 11 wherein said pulley and said case halves are formed of a high impact styrene material.

13. The assembly according to claim 11 wherein said cord is an electrical cord and said pulley has at least one electrical outlet electrically coupled to said cord and attached to said pulley, said outlet extending into an opening formed in a wall of one of said case halves.

14. An electrical cord reel and carrying case assembly comprising:
    a reel having a pair of generally planar, spaced apart disk-shaped bodies, each said body including a generally axially extending circular wall, said walls abutting to form a cord storage surface between said bodies;
    a carrying case having a pair of generally cup-shaped halves surrounding said reel, each of said case halves formed with a bottom wall, a pair of generally planar opposed sidewalls, and a pair of generally curved opposed sidewalls, said sidewalls extending from and generally perpendicular to said bottom wall;
    a carrying handle attached to said carrying case; and
    means for releasably securing said case halves together including at least one locking aperture formed in one of said case halves and at least one locking tab formed on the other one of said case halves, said tab releasably engaging said aperture and said aperture being formed at an end of a slot extending along an inner wall of said one case half.

15. The assembly according to claim 14 wherein each of said case halves has an opening formed in said bottom wall and each of said reel bodies has a circular flange formed on an outwardly facing planar surface adjacent a periphery of said reel body, each of said flanges cooperating with a corresponding one of said openings for rotatably mounting said reel in said carrying case.

16. The assembly according to claim 15 wherein each of said case halves has a radially inwardly extending flange formed about a periphery of said opening for contact with said circular flange on a corresponding one of said reel bodies, and each of said case halves has a spaced apart pair of axially inwardly extending flanges formed on an inwardly facing surface of said bottom wall adjacent said opening for contact with a peripherial portion of said outwardly facing planar surface of said corresponding one of said reel bodies.

17. The assembly according to claim 14 wherein at least one of said case halves has an opening formed in said bottom wall and an adjacent one of said reel bodies has at least one electrical outlet attached to said reel body and positioned in said opening.

* * * * *